May 25, 1965  H. B. SHAPER  3,184,858
HEIGHT GAGE
Filed Sept. 25, 1962  3 Sheets-Sheet 2
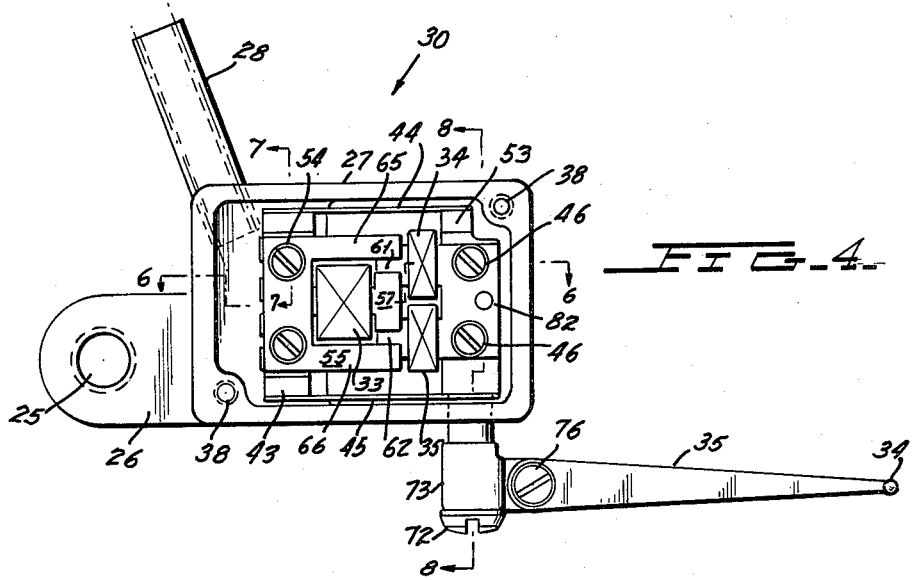
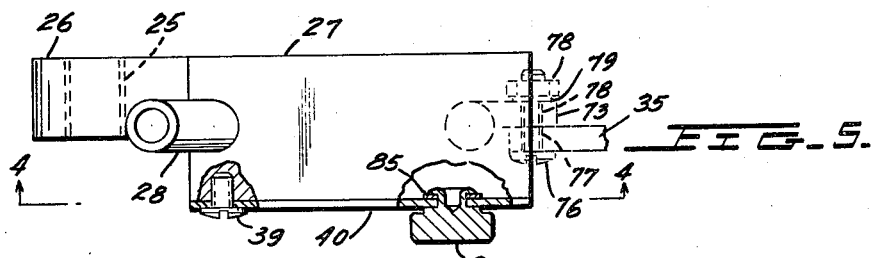
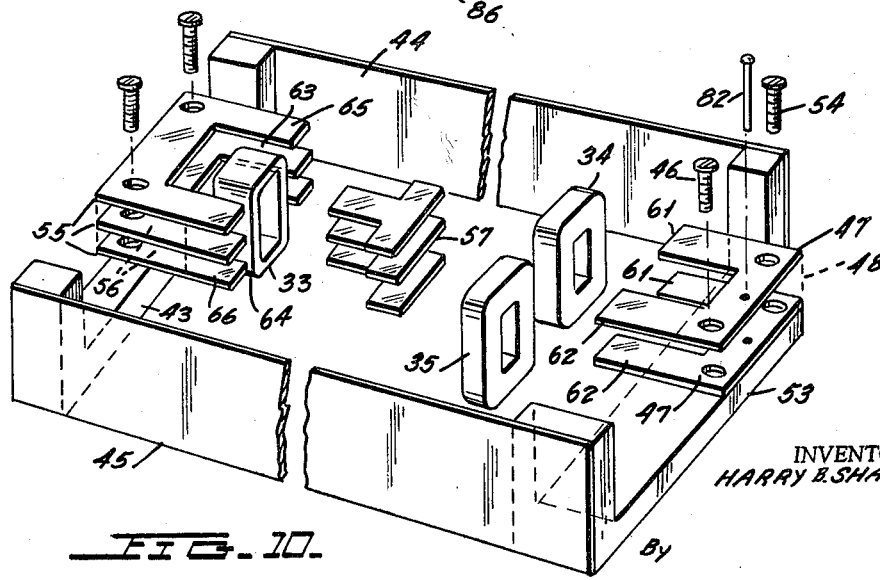
INVENTOR.
HARRY B. SHAPER
By
OSTROLENK, FABER, GERB & SOFFEN
ATTORNEYS May 25, 1965  H. B. SHAPER  3,184,858
HEIGHT GAGE
Filed Sept. 25, 1962  3 Sheets-Sheet 3
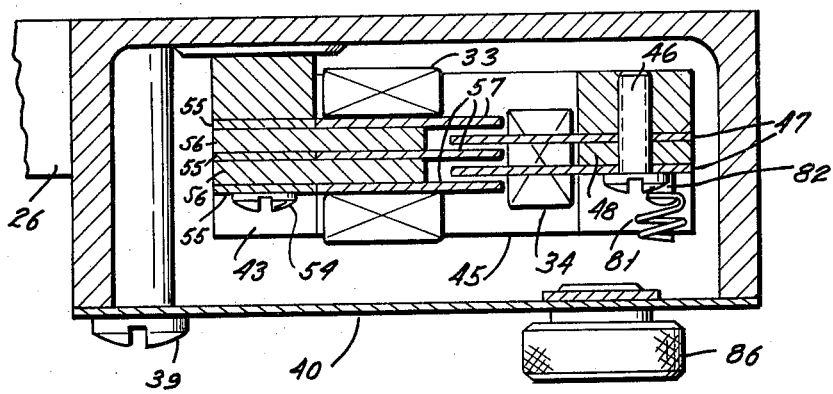
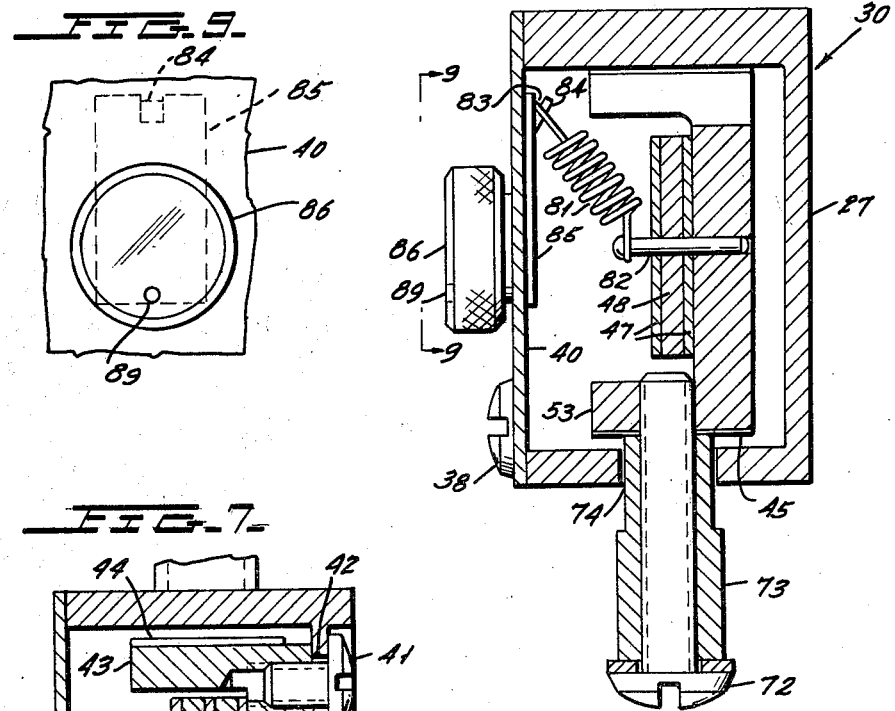
INVENTOR.
HARRY B. SHAPER
BY
OSTROLENK, FABER, GERB & SOFFEN
ATTORNEYS

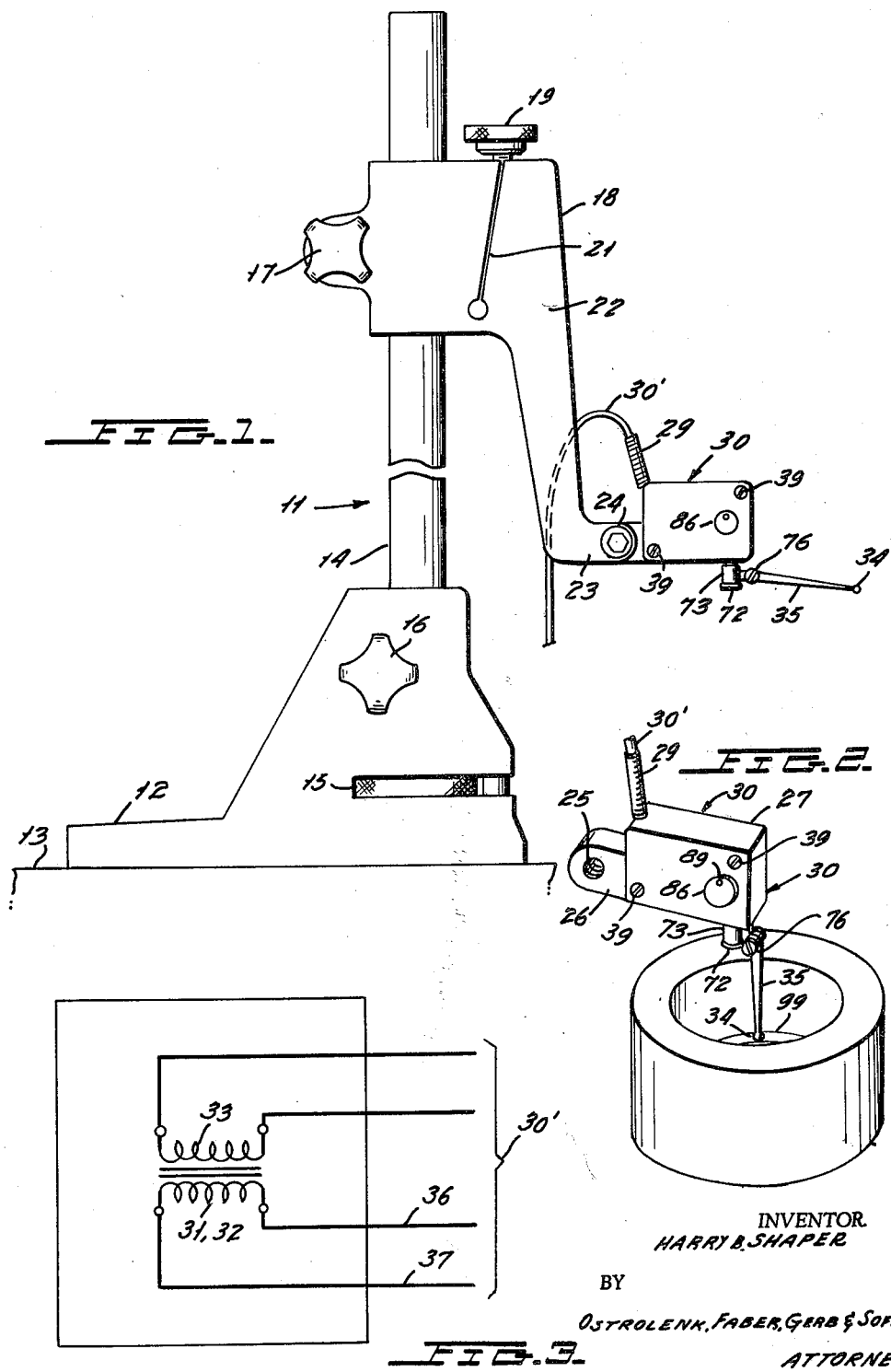

United States Patent Office 3,184,858
Patented May 25, 1965

3,184,858
HEIGHT GAGE
Harry B. Shaper, Roslyn, N.Y., assignor to Dyna-Empire Inc., Garden City, Long Island, N.Y.
Filed Sept. 25, 1962, Ser. No. 225,978
8 Claims. (Cl. 33—172)

This invention relates to mechanical measuring instruments in general and more particularly to an instrument of this type, commonly referred to as a height gage, having a novel transducer.

As is well known to the art a height gage is an instrument for indicating the position of a measured surface with respect to a reference plane. The heart of such an instrument is a transducer device which transforms a small amount of mechanical motion into a magnified electrical signal to indicate whether or not an error is present. This error signal is amplified and the amplified signal serves to drive a visual indicating device.

In the prior art many instruments of this type are provided with transducer devices having magnetic circuits with changes in the magnetic circuit being indicative of the amount by which the measured surface deviates from the position occupied by a known standard used to calibrate the measuring instrument. For the most part these transducer devices are provided with pivotally mounted feeler fingers. Great pains must be taken to prevent movement of the pivot and also to avoid excessive frictional losses at the pivot. In addition, when a pivotally mounted member is provided to alter the magnetic circuit the air gap or gaps in circuit must be kept relatively short or else the instrument loses its sensitivity.

In the device of the instant invention the feeler finger is mounted for linear, rather than pivotal motion, by being mounted to a frame carried by parallel leaf springs. A relatively large dynamic range of movement is obtained without mechanical interference by utilizing a construction in which the magnetic circuit comprises a stationary E-shaped member and a movable C-shaped member. Both of these members are constructed of spaced apart laminates with the laminates forming the C-shaped member arms being interleaved with the laminates forming the E-shaped member legs.

The leaf springs extend parallel to the arms and legs of the C-shaped and E-shaped members thereby guiding the C-shaped member for movement transverse to the arms thereof. In addition, each arm of the C-shaped member is positioned to partially overlap and extend across the gap between the outer and the center leg of the E-shaped member. With this construction a relatively large movement of the C-shaped member is possible without mechanical interference with the E-shaped member.

Accordingly a primary object of this invention is to provide a novel construction for the mechanical instrument adapted for making measurements of linear dimensions.

Another object is to provide an improved construction for a transducer device utilized for transforming mechanical motion into an electrical signal indicative of the mechanical motion.

Still another object is to provide a transducer device of this type having a variable magnetic circuit with improved sensitivity characteristics.

A further object is to provide a transducer device of this type having a variable magnetic circuit including an armature mounted for movement within a relatively large dynamic range.

A still further object is to provide a transducer device of this type in which the magnetic armature is mounted for substantial linear movement.

These as well as other objects of this invention shall become readily apparent after reading the following description of the accompanying drawings in which:

FIGURE 1 is a side elevation of a height gage including a transducer constructed in accordance with the teachings of the instant invention.

FIGURE 2 is a fragmentary perspective illustrating the utilization of the height gage for the measurement of an internal shoulder.

FIGURE 3 is an electrical schematic of the error detecting means.

FIGURE 4 is a side elevation of the transducer device, with the housing cover removed, looking in the direction of arrows 4—4 of FIGURE 5.

FIGURE 5 is a plan view of the transducer.

FIGURES 6 through 8 are cross-sections taken through lines 6—6, 7—7, and 8—8, respectively, of FIGURE 4 looking in the directions of the respective arrows.

FIGURE 9 is a fragmentary side elevation of the transducer device looking in the direction of arrows 9—9 of FIGURE 8.

FIGURE 10 is an exploded perspective of the magnetic circuitry.

Now referring to the figures. FIGURE 1 shows height gage 11 with the base 12 thereof resting upon surface 13. Vertical rod 14 extends upwardly from base 12 and is adjustable with respect thereto by rotation of knob 15. Knob 16 operates a well-known means (not shown) which locks rod 14 in vertical position. Clamping knob 17 fixes the vertical position of support 18 relative to rod 14. Adjusting screw 19 is threadably mounted to support 18 in the vicinity of bend cut 21. Employing a wedging action well-known to the art, manipulation of knob 19 is effective to cause the forward portion 22 of support 18 to move relative to rod 14 with this movement taking place at cut 21.

The lower end of portion 22 is provided with an outturned projection 23. Fastening means 24 extending through aperture 25 secures transducer 30 to support 18 at projection 23. Aperture 25 extends through projection 26 at the rear of transducer housing 27.

Nipple 28 extending through the top surface of housing 27 is surrounded by coil spring 29. Nipple 28 and spring 29 form a passage for cable 30' which carries the energizing and signalling conductors for transducer 30. Feeler arm 35 is positioned at the forward end of transducer 30 and is swivel mounted in a manner to be hereinafter explained.

The height of a surface relative to surface 13 is determined by engaging the surface to be measured by ball 34 at the free end of finger 35. As will be fully explained hereinafter, the positioning of arm 35 is effective to position the elements of a magnetic circuit in a manner to vary the coupling between exciter coil 33 and pick-up coils 31, 32. In a manner well-known to the art, exciter coil 33 is energized by an A.C. signal which is effective to induce voltages in pick-up coils 31, 32. Coils 31, 32 are connected in opposing relationship so that when equal voltages are induced in coils 31, 32 a zero voltage appears across signal lines 36, 37.

Now referring more particularly to FIGURES 4 through 10 for a detailed description of transducer 30. Housing 27 is a generally rectangular hollow structure provided with threaded apertures 38 in diagonally opposite corners thereof. Apertures 38 receive screws 39 which fasten housing cover 40 in place. Screws 41 extend through clearance apertures 42 in the rear surface of housing 27 and are received by threaded apertures in the web of the C-shaped stationary magnetic circuit support member 43 to secure the latter in fixed position relative to housing 27. Parallel leaf springs 44, 45 are welded or otherwise secured to the arms at the top and bottom of member 43 and extend forwardly therefrom. Springs 44 and 45 are secured at their forward ends to movable reverse C-shaped magnetic circuit support member 53.

Screws 46 extend through clearance apertures in U-shaped armature plates 47 and spacers 48 and are received in threaded apertures of support member 53. Thus, screws 46 fixably secure armature plates 47 to movable support 53 so that plates 47 and support 53 move as a unit.

Similarly, screws 54 extend through clearance apertures in C-shaped magnetic plates 55 and spacers 56 interposed between plates 55. The leg of the center one of three T-shaped magnetic plates 57 is clamped between spacers 56 while the other T-shaped magnetic plates 57 are mounted outboard of spacers 56. Exciter coil 33 is mounted to the legs of T-shaped plates 57 while pick-up coils 34, 35 are mounted to individual arms of armature forming sheets 47 being held in place by suitable dielectric cement.

Thus, it is seen that C-shaped sheets 55 and T-shaped sheets 57 cooperate to form E-shaped laminates each having a center leg which is enlarged at the free end thereof. This is the stationary magnetic structure of transducer 30. The movable magnetic structure of transducer 30 is formed by laminates 47.

The free ends of the arms of laminates 47 are interleaved with the free ends of the legs of the stationary magnetic structure with arms 61 and 62 bridging air gaps 63 and 64, respectively. Gap 63 is formed between leg 65 and one end of the T-arm while gap 64 is formed between arm 66 and the other end of the T-arm. Parallel leaf springs 44 and 45 mount member 53 for substantial linear motion in vertical directions with respect to FIGURE 4. Thus, the movable magnetic structure is movable in a plane parallel to the laminations forming the magnetic structure.

In FIGURE 4 the movable magnetic structure is centered with respect to the stationary magnetic structure. Upon upward movement of member 53 arm 61 and leg 65 have increased overlap while arm 62 and leg 66 have decreased overlap. Further, there is an increased overlap between arm 62 and the arm of the T and a decreased overlap between arm 61 and the arm of the T. However, the total overlap between arms 61 and 62 and the arm of the T remains constant so long as both arms 61 and 62 span air gaps 63, 64.

With the magnetic circuit forming elements in the centered position of FIGURE 4, equal voltages are induced in pickup coils 34, 35 so that there is zero voltage across signal lines 36, 37. Increased overlap between arm 61 and leg 65 decreases the reluctance of the magnetic path encompassed by pickup coil 34 so that an increased voltage is induced therein. In like manner, decreased overlap between arm 62 and leg 66 increases reluctance of the magnetic path encompassed by pickup coil 35 so that a reduced voltage is induced therein.

The bottom leg of member 53 is provided with a threaded aperture which receives screw 72 (FIGURE 8). Screw 72 extends through a clearance aperture in pivot member 73 and drives the upper end of member 73 firmly into engagement with the bottom surface of the lower spring 45 at a point where this spring is secured to member 53. The reduced portion at the upper end of member 73 is rounded and extends through clearance aperture 73 in the bottom surface of housing 27 so that member 73 is free to move vertically with respect to housing 27. The lower end of member 73 is provided with a flat side extension having clearance aperture 75. Clamping screw 76 extends through feeler arm clearance aperture 77 as well as aperture 75 and is received by nut 78. Lock washer 79 is interposed between nut 78 and member 73.

Thus, it is seen that clamping screw 72 provides a vertical axis about which feeler arm 35 is adjustable and screw 76 provides a horizontal axis about which feeler arm 35 is adjustable. This mounting arrangement has the advantage of enabling height gage 11 to be readily utilized for measurements of an internal surface such as shoulder 99 of FIGURE 2.

In FIGURE 8 transducer 30 is shown set to measure surfaces positioned above ball tip 34. That is, tension spring 81 is so positioned that the movable portion of the magnetic circuit is biased upwardly and will be moved downwardly when ball 34 engages the surface being measured. One end of spring 81 is mounted to pin 82 extending from member 53 while the other end of spring 81 is mounted within spring notch 83 formed by ear 84 of member 85. The latter is secured to a reduced diameter portion of UP-DOWN knob 86 which extends through an aperture in cover 40.

Knob 86 may be rotated 180° in a clockwise direction from its position of FIGURES 8 and 9 to a position wherein indicating dot 89 will be above the position illustrated. In this new position of knob 86 the end of spring 81 secured to ear 84 is moved downward so that spring 81 biases the movable magnetic structure downward. In this position transducer 30 is set for the measurement of surfaces positioned below ball 34.

Thus, this invention provides a novel transducer for a height gage. The transducer is so constructed that a large dynamic range of movement is obtained without sacrificing sensitivity of accuracy.

Although there has been described a preferred embodiment of this novel invention, many variations and modifications will now be apparent to those skilled in the are. Therefore, this invention is to be limited, not by the specific disclosure herein, but only by the appending claims.

The embodiments of the invention in which an exclusive privilege or property is claimed are defined as follows:

1. A transducer of the class described comprising means defining a magnetic circuit of relatively low reluctance, said circuit comprising a first and a second portion, said first portion being generally E-shaped and including a first, a second, and a third leg and a web from which said legs extend, said second portion being generally U-shaped and including a first and a second arm and a web from which said arms extend; mounting means for normally maintaining said portions in a neutral position wherein said first and said second legs overlap said first and said second arms, respectively; said mounting means constructed to guide movement of one of said portions, in the plane thereof, relative to the other of said portions; said portions being arranged such that movement of said one portion in a first direction from said neutral position increases the overlap between said first leg and said first arm while decreasing the overlap between said second leg and said second arm thereby controlling magnetic flux in different parts of said circuit in a manner indicative of the amount said one portion has been displaced from said neutral position; said webs positioned remote from each other with said legs extending in one direction and said arms extending in the opposite direction, said mounting means comprising a leaf spring means with said one portion carried at one end of said spring means and said other portion carried at the other end of said spring means, said spring means extending generally perpendicular to said first direction, said third leg position between the other legs with a first gap between said first and said third legs and a second gap between said second and said third legs; said first and said second arms spanning said first and said second gaps, respectively, whereby as said one portion moves in said first direction there is a combined overlap between said third leg and said arms which remains substantially constant.

2. The transducer of claim 1 in which the web of said first portion is longer than the web of said second portion.

3. The transducer of claim 1 in which each of said portions include a plurality of spaced laminates with the laminates of said one portion being interleaved with the laminates of the other portion without physical engagement therebetween.

4. The transducer of claim 3 in which said second portion constitutes said one portion.

5. The transducer of claim 3 in which there is a feeler arm and securing means connecting said feeler arm to said one portion.

6. The transducer of claim 5 in which the securing means includes a section for adjusting the position of the feeler arm relative to said one portion and maintaining said feeler arm in adjusted position.

7. The transducer of claim 6 in which the section comprises a swivel means.

8. The transducer of claim 7 in which there is an individual pickup coil for each of said arms and an exciter coil for said third leg.

References Cited by the Examiner
UNITED STATES PATENTS

| | | | |
|---|---|---|---|
| 2,027,140 | 1/36 | Alexanderson | 336—134 |
| 2,281,453 | 4/42 | Peterson | 33—147 |
| 2,445,455 | 7/48 | Rights | 33—172 |

FOREIGN PATENTS 706,837   4/54   Great Britain.

ISAAC LISANN, *Primary Examiner.*